(12) United States Patent
Chittor et al.

(10) Patent No.: US 6,298,420 B1
(45) Date of Patent: Oct. 2, 2001

(54) COHERENT VARIABLE LENGTH READS FROM SYSTEM MEMORY

(75) Inventors: Suresh Chittor; Chih-Cheh Chen; Sin Sim Tan, all of Hillsboro; Jonathan Nick Spitz, Portland, all of OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/567,139

(22) Filed: May 8, 2000

Related U.S. Application Data

(62) Division of application No. 09/013,097, filed on Jan. 26, 1998, now Pat. No. 6,061,764.

(51) Int. Cl.[7] ................................................. G06F 12/02
(52) U.S. Cl. ........................... 711/147; 711/141; 710/128
(58) Field of Search ................................... 711/117, 118, 711/143, 144, 145, 146, 147; 710/128, 129

(56) References Cited

U.S. PATENT DOCUMENTS

| | | | |
|---|---|---|---|
| 5,345,566 | * | 9/1994 | Tanji et al. ............................. 710/128 |
| 5,546,546 | * | 8/1996 | Bell et al. ............................. 710/112 |
| 5,586,274 | * | 12/1996 | Bryg et al. ............................. 710/108 |
| 5,611,058 | * | 3/1997 | Moore et al. ......................... 710/129 |
| 5,623,628 | * | 4/1997 | Brayton et al. ....................... 711/141 |
| 5,737,756 | * | 4/1998 | White et al. .......................... 711/142 |
| 5,812,803 | * | 9/1998 | Pawlowski et al. .................. 710/129 |
| 5,822,767 | * | 10/1998 | MacWilliams et al. ............. 711/146 |
| 5,832,241 | * | 11/1998 | Guy et al. ............................. 710/112 |
| 5,896,513 | * | 4/1999 | Fisch et al. ........................... 395/527 |
| 5,953,538 | * | 9/1999 | Duncan et al. ........................ 710/22 |
| 6,003,105 | * | 12/1999 | Vicard et al. ......................... 710/129 |

* cited by examiner

*Primary Examiner*—Hiep T. Nguyen
(74) *Attorney, Agent, or Firm*—Kenyon & Kenyon

(57) ABSTRACT

Method and apparatus for processing serial bus read requests in a memory controller when the memory controller interfaces to both a pipelined bus and a serial bus. According to the method, the read request message is received and is split into several atomic transactions. The atomic transactions are issued on the pipelined bus. Data related to the several atomic transactions is stored in a queue. The requested data is read from the queue and placed in a response message on the serial bus.

2 Claims, 3 Drawing Sheets

COHERENT VARIABLE LENGTH READS FROM SYSTEM MEMORY

This application is a divisional of Ser. No. 09/013,097 filed Jun. 26, 1998 now U.S. Pat. No. 6,061,764.

BACKGROUND OF THE INVENTION

The present invention relates to a control protocol in memory controller that handles read requests for data of variable length from a serial bus.

Modern computer systems are multiple agent systems. An agent typically is a computer device having some processing power that performs a predetermined function of the computer system. For example, one or more processors may perform operations of a computer program. A memory controller administers the reading and writing of program instructions ani data from memory to other agents. Input-output (I/O) devices communicate data to and from the computer system to its external environment.

The agents must coordinate with one another to perform their respective functions. Accordingly, the agents communicate with one over a bus according to a predetermined bus protocol. As various agents have evolved, varying bus protocols have become known. Bus protocols typically are not compatible with other bus protocols. Each may provide different advantages or disadvantages relative to others. In a single computer system, multiple buses may be used.

FIG. 1 illustrates a multiple agent system using several buses. Agents 10–50 coordinate among each other via a pipelined bus 60. Agent 50 may be a memory and input/output controller 100 ("MIOC") and include a memory subsystem 200. The MIOC cooperates with other agents to exchange data between the memory 200 and data caches of the agents, such as cache 14. The MIOC 100 interfaces the agents on the pipelined bus 60 to agents of one or more secondary, serial buses 70. The serial bus 70 interfaces the MIOC 100 with other agents 80. The serial bus agents 80 may be bridging agents that interface the serial bus 70 tertiary buses 90. Thus, a single computer system may include a variety of buses each operating according to its own protocol.

A "transaction" is a set of activities on a bus related to a single request issued by an agent. In a pipelined bus, a transaction proceeds sequentially through several phases. Signaling for each phase may be exchanged among the agents 10–50 on different data lines (not shown) contained within the pipelined bus 60. Consequently, at any given time, several transactions may be in progress simultaneously on the pipelined bus provided that they are in mutually different phases. Transactions on the pipelined bus are processed in the order in which they are posted.

As a representative example, the known Pentiumr Pro processor, supports a pipelined bus that advances a transaction through six phases:

Arbitration, in which an agent becomes the bus owner,
Request, in which a request is made identifying an address,
Error, in which errors in the request phase are identified,
Snoop, in which cache coherency checks are made,
Response, in which the failure or success of the transaction is indicated, and
Data, in which data may be transferred.

In the Pentium® Pro processor, up to four cycles of 8 byte data may be transferred in the data phase. Not all phases occur for every transaction. Other processors support pipelined buses in other ways.

In a serial bus 70, messages are exchanged among agents to implement a transaction. A first message carries a request from one agent to another. A second message carries a response to the request back to the requesting agent. Several transactions may be underway at once on the serial bus. Messages include a transaction ID field to identify the transaction to which the message relates.

On the serial bus, read request messages identify the request type. The message also includes an address of data to which the request is directed and a length of data to be read. The address identifies a starting point for reading data; the length field indicates how much data should be read from memory beginning at that address.

Read requests typically are answered by a response that provides the requested data. The response message typically includes a header that includes a response type, a transaction ID and a length field identifying the length of the data that follows. When the read request cannot be fulfilled for any reason, the request may be answered by a RETRY response.

The length of data that may be transferred in a transaction on the serial bus 70 is not limited in the same way that transactions on the pipelined bus 60 are limited. For example, data of several cache lines may be transferred in a single response on the serial bus 70. However, when data of a transaction is transferred on the serial bus 70, all the data must be transferred in a single response that completes the transaction. The data may not be split into two responses.

To simplify terminology herein, transactions performed on the pipelined bus 60 are referred to as "pipelined bus transactions." Transactions performed on the serial bus 70 are referred to as "serial bus transactions."

As is known, data is stored in memory 200 organized as cache lines. The size of a cache line typically relates to the largest increment of data that may be transferred in a single pipelined bus transaction. For example, in the Pentium® Pro, a cache line is 32 bytes long (4 cycles of 8 byte data). The cache line is broken up into an integral number of "cache segments." Cache segments are a basic increment of data that is transferred in a single cycle of data transfer, for example, 8 bytes in the Pentium® Pro processor.

In the pipelined bus 60, if an agent requires data of multiple cache lines, the agent would issue multiple requests on the external bus. The data would be transferred to the requesting agent in accordance with the several transactions. Depending on the operations to be performed by the other agents' on the pipelined bus, the multiple requests of the first agent may or may not be performed sequentially on the pipelined bus 60.

It is desirable for an MIOC 100 to receive and process serial bus transactions that transfer data exceeding a cache line. By doing so, throughput of the serial bus 70 is increased. However, the MIOC 100 must coordinate with agents on the pipelined bus 60, for cache coherency and other purposes. An agent 10 may modify data at an address and store the modified data in an internal cache 14 without notifying other agents on the pipelined bus 60. To respond to a read request from the serial bus 70, the MIOC 100 must perform cache coherency checks to determine whether modified copies of the requested data exist. The bus protocol of the pipelined bus 60 does not recognize cache coherency transactions in excess of a cache line. No known memory controller processes read requests from a serial bus 70 that implicate data of multiple cache lines.

Further, agents of a serial bus 70 may handle data in increments that are smaller than a cache segment. No known memory controller processes read requests from a serial bus 70 that implicate data at a data segment level, where data segments are smaller than cache segments on the pipelined bus.

Accordingly, there is a need in the art for a memory controller that interfaces a pipelined bus with a serial bus that processes serial bus transactions that requests data of a variable number of data segments, the data segments being independent of the cache lines.

SUMMARY OF THE INVENTION

Embodiments of the present invention provide a method of processing serial bus read requests in a memory controller when the memory controller interfaces to both a pipelined bus and a serial bus. According to the method, the read request message is received and is split into several atomic transactions. The atomic transactions are issued on the pipelined bus. Data related to the several atomic transactions is stored in a queue. The requested data is read from the queue and placed in a response message on the serial bus.

DETAILED DESCRIPTION

The present invention provides a memory controller that interfaces to both a pipelined bus and a serial bus. The memory controller is capable of processing serial bus transactions that request data spanning multiple cache line' in memory. The memory controller does so without interruption of the pipelined bus protocol.

When the MIOC 100 receives a serial bus transaction that requests data spanning more than one cache line, it splits the transactions into "atomic transactions." Atomic transactions are pipelined bus transactions issued on the pipelined bus 60 sequentially without interruption. The MIOC 100 receives data of the several transactions and queues the data internally. When all the data related to the serial bus transaction is queued, the MIOC 100 generates a completion message on the serial bus conveying the data to a requesting agent.

The memory controller 100 optionally processes data in increments that are smaller than the increments exchanged on the pipelined bus 60.

Figure 1:
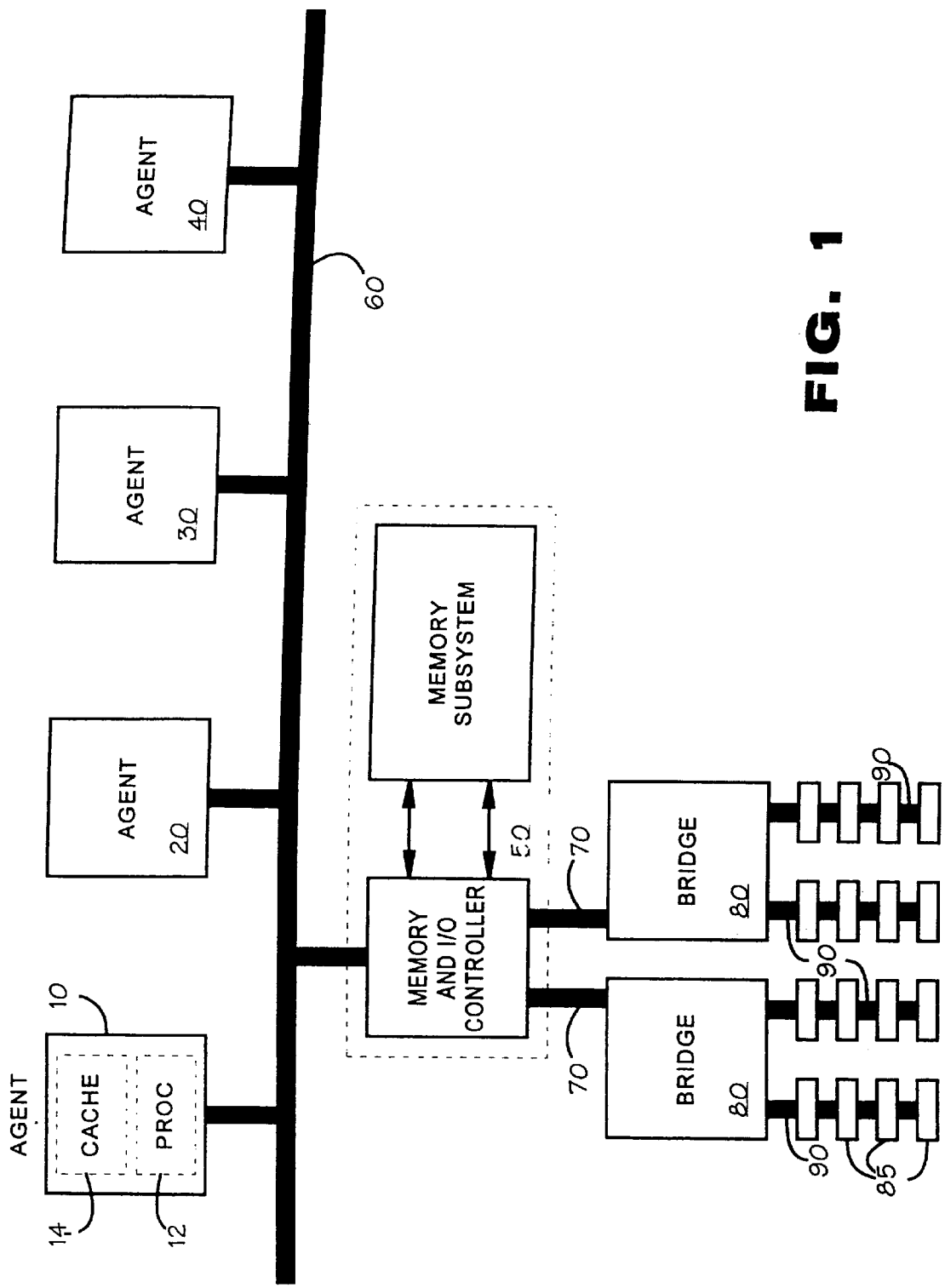
FIG. 1 is a block diagram of a system constructed in accordance with an embodiment of the present invention.
Figure 2:
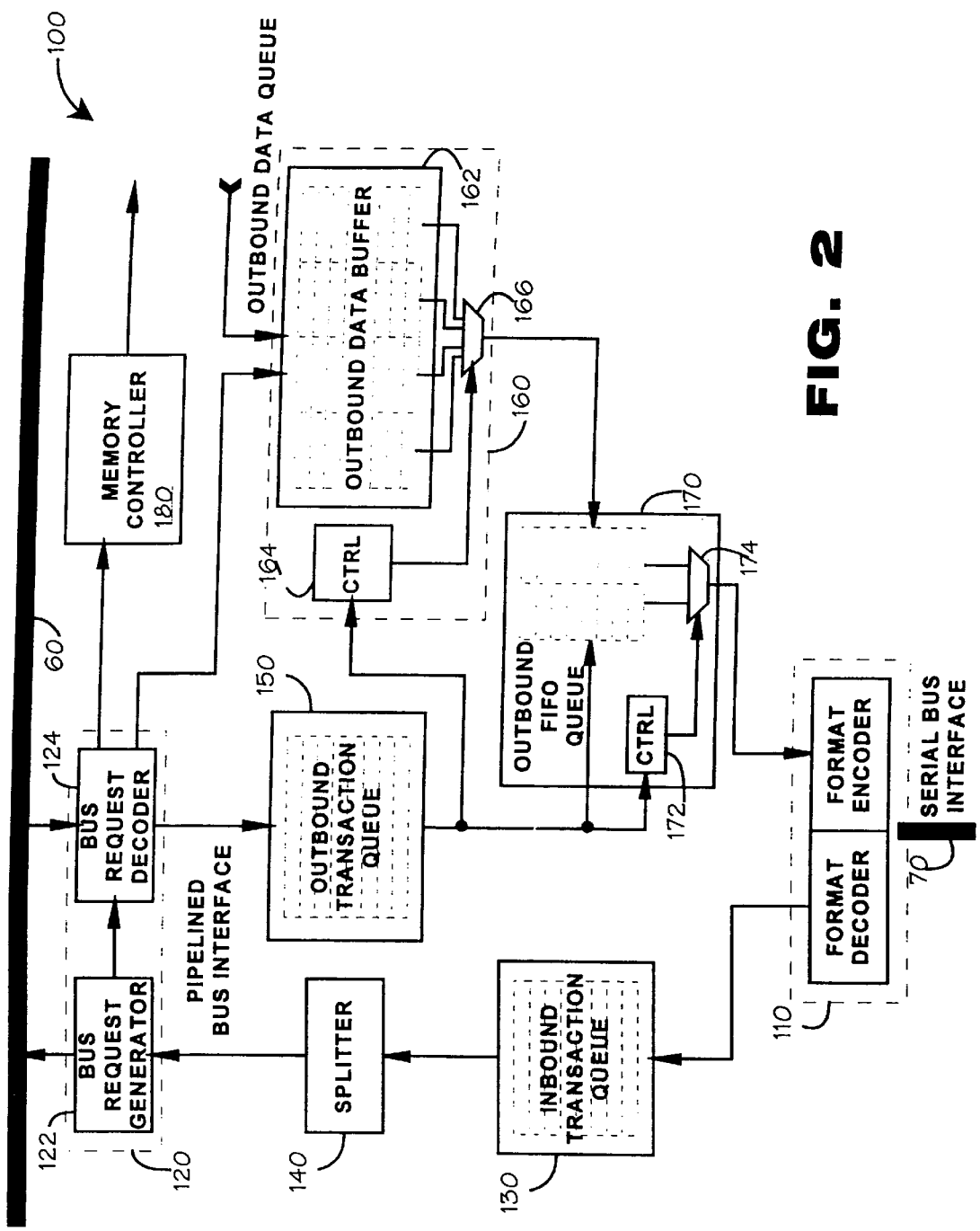
FIG. 2 is a block diagram of a memory controller constructed in accordance with an embodiment of the present invention.

FIG. 2 illustrates a partial block diagram of an MIOC 100 constructed in accordance with an embodiment of the present invention. The MIOC 100 includes a serial bus interface 110 and a pipelined bus interface 120 connecting the MIOC 100 to the serial bus 70 and the pipelined bus 60 respectively. The serial bus interface 110 includes a format decoder 112 that receives and decodes messages from the serial bus 70. It also includes a format encoder 114 that encodes messages for transmission over the serial bus 70. Likewise, the pipelined bus interface 120 includes a bus request generator 122 that issues pipelined bus transactions. It also includes a bus request decoder 124 that monitors signals on the pipelined bus and responds to them.

Components of the MIOC 100 may be organized into an inbound path and an outbound path. "Inbound" refers to transaction data that propagates from the serial bus 70 toward the pipelined bus 60. Conversely, "outbound" refers to transaction data that propagates from the pipelined bus 60 to the serial bus 70.

The inbound path includes an inbound transaction queue 130 and a splitter 140. The inbound transaction queue 130 stores transaction information that has been decoded by the format decoder 112. Typically, the format decoder 112 decodes a message into a format appropriate for the pipelined bus 60. The inbound transaction queue 130 also stores data that is inappropriate for the pipelined bus 60, such as the transaction ID and the length field received from a read request message. This information is used internally.

The splitter 140 reads transactions from the inbound transaction queue 130 and, where appropriate, presents them to the bus request generator 122 to be posted on the pipelined bus 60. For queued read request, the splitter 140 examines the length field and issues atomic transactions or non-atomic transaction.

The outbound path includes the bus request decoder 124, an outbound transaction queue 150, a staging buffer 160, an outbound FIFO queue 170, an outbound transaction controller 180 and the format encoder 114. Transaction information is stored in the outbound transaction queue 150. Data to be transmitted to the serial bus 70 is queued in the staging buffer 160. The administrative information is decoded by the outbound transaction controller 180. The controller 180 causes data to be assembled in the outbound FIFO queue 170. The outbound transaction controller 180 generates a response header, delivers it to the format encoder 114 and causes the data in the outbound FIFO queue 170 to be output to the format encoder 114. The format encoder 114 formats the data into a response and outputs it on the serial bus 70.

The staging buffer 160 is a random access memory. It includes a number of queue entries 162 possessing a width of a cache line. The staging buffer 160 also includes a controller 164 and a selection switch 166. The controller 164 selects a cache line to be read out. The selected cache line is input to the selection switch 166. Under control of the controller 164, switch 166 outputs a selected cache segment from the cache line.

The outbound FIFO queue 170 possesses a number of queue entries 172 each having a width of apache segment. Data is read from the outbound FIFO queue 170 to the format encoder 114 under control of the outbound transaction controller 180.

In the embodiment shown in FIG. 2, data may be read from the outbound FIFO queue 170 in increments smaller than a cache segment. For example, data may be read on as a data segment basis. The outbound FIFO queue 170 includes a selection switch 176, also controlled by the outbound transaction controller 180, receiving each of the data segments at an input. The selection switch 176 outputs a selected data segment from a cache segment.

Where data is to be read out of the outbound FIFO queue 170 on a cache segment basis, selection switch 176 is omitted.

Processing Of Read Requests From The Serial Bus

The MIOC 100 is adapted to process a variety of transactions on the pipelined and serial buses 60 and 70. The following discussion presents the MIOC 100 as it responds to variable length read requests from the serial bus 70.

The read request is received from the serial bus 70 by the format decoder 112, decoded into a format suitable for the pipelined bus and queued in the inbound transaction queue 130 as described above. When the read request advances out of the inbound transaction queue 130, the splitter 140 examines the address and length field and determines whether the requested data spans more than one cache line.

If the requested data falls within a single cache line, the splitter 140 issues a single non-atomic transaction. If the requested data spans more than one cache line, the splitter 140 issues a multiple number of atomic transactions.

The Non-Atomic Transaction

In the case of a non-atomic transaction, the splitter 140 passes the request to the bus request generator 122. The bus request generator 122 determines whether the request references data from the memory subsystem 200 or whether the address is administered by another agent. If the address does not belong to memory subsystem 200, the bus request generator 122 posts a read transaction on the pipelined bus. The address of the read request as it is posted on the pipelined bus 60 may be cache aligned. Otherwise, the bus request generator 122 posts a read-invalidate transaction on the pipelined bus 60. After posting the transaction on the pipelined bus 60, the bus request generator 122 releases the bus in accordance with normal bus protocol.

Cache alignment of an address causes the address to match the address of the beginning of the cache line in which it sits. For example, if the invention were integrated with the pipelined bus of the Pentium® Pro processor, bits A[35:5] of an address reference a cache line. Address bits A[4:2] reference one of four cache segments within the cache line. Address bits A[4:2] may be set to zero to align the address with the origin of a cache line. Thus, the lower order bits of the true address may differ from the lower order bits of the cache aligned address. To integrate the invention with a pipelined bus of another processor, other conventional address alignment may be performed.

Read-invalidate transactions are conventional pipelined bus transactions to perform cache coherency checks. As described, data may be shared among the agents of the pipelined bus 60. An agent may hold a modified copy of data at an address. The read invalidate transaction to an address causes any agent with a modified copy of the data to so indicate in a cache coherency phase of the transaction. If modified data is held by an agent, the modified data is read from the agent to the MIOC 100 during a data phase of the transaction. Accordingly, data related to the read invalidate request will be present either on the pipelined bus or from within the memory subsystem 200.

The bus request generator 122 also passes the transaction ID, the length field and the true lower order address bits to the bus request decoder 124 internally.

The bus request decoder 124 observes the transaction on the pipelined bus 60 and receives the transaction ID, length field and true address bits from the bus request generator 122. In response to the transaction, it stores the transaction information in the outbound transaction queue 150. The bus request decoder also allocates a cache line of space in the staging buffer 160 and stores a pointer to the cache line in the outbound transaction queue 150.

If the pipelined bus transaction is a read request, the bus request decoder 124 receives the requested data from the pipelined bus and stores it in the staging buffer 160.

If the request is a read invalidate transaction, the bus request decoder 124 causes a memory controller 190 to fetch data of the cache line from the memory subsystem 200 and store it in the staging buffer 160. The bus request decoder 124 also observes cache coherency signaling on the pipelined bus 60. If the cache coherency results indicate modified data present in another agent, the bus request decoder 124 causes the memory controller 190 to discontinue fetching of the data. The data instead is received by the bus request decoder 124 from the pipelined bus 60 and stored in the staging buffer 160.

When the pipelined bus transaction is complete, the outbound transaction queue 150 stores transaction information and the staging buffer 160 stores an entire cache line of data. To generate the response message on the serial bus 70, the requested data is read from the cache line and placed in a response message.

When a transaction reaches the head of the outbound transaction queue 150, the outbound transaction controller 180 decodes the transaction. It causes the data to be read from the staging buffer 160 to the outbound FIFO queue 170.

Data is read from the staging buffer 160 one cache segment at a time. To access an appropriate cache segment, the controller 164 is initialized with the pointer identifying the cache line, lower order bits of the true address and the length field. The address bits identify the first cache segment to be read. The controller 164 causes the selection switch 166 to pass the selected cache segment to the outbound FIFO queue 170. Based on the length field, the controller 164 advances to the adjacent cache segments and reads them out of the staging buffer 160.

The outbound transaction controller 180 generates a response and outputs it to the format encoder 114. It also causes the queued data stored in the outbound FIFO queue 170 to be read to the format encoder 114. Where data is read out in data segment increments, the outbound transaction controller 170 identifies a first data segment based on the true address bits. The outbound transaction controller 180 causes the selection switch 174 to pass a selected data segment to the format encoder 114. The outbound transaction controller 180 advances to a next adjacent data segment and reads it out. The outbound transaction controller 180 continues to read out data segments until it traverses the length of data specified in the length field.

A better understanding of the operation of the staging buffer 160 and the outbound FIFO queue 170 is facilitated by an example of the present invention having been applied to the pipelined bus of the Pentium® Pro processor. As noted, the Pentium® Pro processor is designed with a cache line length of 32 bytes and a cache segment length of 8 bytes. Address bits A[35:5] identify each cache line, and address bits A[4:3] identify cache segments. The address bits A[4:3] would be input to the controller 164 of the staging buffer 160 to initialize the selection switch 166 to the first cache segment to be read.

Continuing with the example above, consider a serial bus protocol that defines a data segment to be 4 bytes long. The address bit A[2] within the address would identify the position of the first requested data segment in the outbound FIFO queue 170. The address bit A[2] may be used by outbound transaction controller 180 to initialize selection switch 174.

To apply the present invention to pipelined buses other than the Pentium® Pro processor, having different definitions of cache lines, different address bits may be used to identify positions of cache segments and data segments.

As data is read out of the outbound FIFO queue 170, it is input to the format encoder 114. The format encoder 114 formats a response message according to the protocol of the serial bus 70 and outputs it from the MIOC 100.

Thus, for a read request from the serial bus that implicates data contained within a single cache line in the memory subsystem 200, the memory controller 100 retrieves the requested data and presents it on the serial bus 70. The requested data may be output on a data segment basis.

The Atomic Transaction

When a read request from the serial bus references data that crosses a boundary of a cache line, the MIOC 100 issues atomic transactions on the pipelined bus 60. Atomic transactions are read or read invalidate transactions issued sequentially without interruption directed to each cache line implicated by the serial bus read request.

As noted, the splitter 140 observes the transaction as it advances out of the inbound transaction queue 130. From the length field, the splitter 140 determines that the transaction requests data of multiple cache lines. In response, the splitter 140 issues atomic transactions to the bus request generator 122. With one exception, the splitter enables an atomic flag with each atomic transaction. The atomic flag is disabled for the final atomic transaction in the series. Thus, the beginning and end of a series of atomic transactions is indicated by the status of the atomic flag.

For the first atomic transaction, the splitter 140 cache aligns the requested address. The splitter 140 provides both the cache aligned address and the lower order bits of the true address to the bus request generator 122. For subsequent atomic transactions, the splitter 140 increments the cache aligned address by a cache line and provides the incremented address to the bus request generator 122. No lower order bits need be provided for subsequent atomic transactions.

When the bus request generator 122 observes the first atomic transaction, it posts a read or read invalidate transaction on the pipelined bus. As with the non-atomic transaction, read invalidate transactions are issued when the requested cache line is found in the memory subsystem 200. Read transactions are issued when the requested cache line is not found in the memory subsystem 200.

According to conventional pipelined bus protocol, after posting a transaction, an agent releases its ownership of the bus to another agent. For atomic transactions, however, the bus request generator 122 does not release ownership of the pipelined bus 60. Instead, it retains ownership and posts the subsequent atomic transactions. The bus request generator 122 retains ownership until it has posted the final atomic transaction in the sequence. The first transaction observed by the bus request generator 122 that does not possess an enabled atomic flag is the last of the atomic transactions. Thus, the bus request generator 122 posts all atomic transactions sequentially without interruption.

The bus request decoder 124 observes the atomic transactions on the pipelined bus 60. It also receives from the bus request generator 122 the atomic flags of the atomic transactions along with the transaction ID, the length field and the true lower order address bits. The bus request decoder 124 decodes atomic transactions as it would any read transaction issued by the MIOC 100 on the pipelined bus 60. It allocates data in the staging buffer 160 and stores the transaction information in the outbound transaction queue 150.

As with non-atomic transactions described above, for read transactions, the bus request decoder 124 reads the data to the staging buffer 160. For read-invalidate transactions, the bus request decoder 124 may cause the memory controller 190 to fetch the cache line identified in the atomic transaction unless another agent indicates that modified data exists. When modified data is present, the bus request decoder 124 reads the data from the pipelined bus to the staging buffer 160.

At the conclusion of the final atomic transaction, administrative data of each atomic transaction is stored in the outbound transaction queue 150. The outbound transaction queue 150 stores the transaction ID, the length field and the true value of the lower order address bits with the administrative data of the first atomic transaction. The staging buffer 160 stores data associated with each atomic transaction.

Eventually, the first atomic transaction advances out of the outbound transaction queue 150. It is decoded by the outbound transaction controller 180. From the atomic flag, the outbound transaction controller 180 determines that the transaction is part of an atomic sequence.

The outbound transaction controller 180 causes data of the first atomic transaction to be read from the staging buffer 160. The pointer of the first atomic transaction identifies the of cache line's position in the staging buffer 160. The true lower order address bits identify the first cache segment to be read out. The outbound transaction controller 180 sends this data to the staging buffer controller 164. The outbound transaction controller 180 also calculates the number of cache segments to be read from the first cache line and provides this information to the staging buffer controller 166. In response, the staging buffer controller 166 reads data from the cache lines beginning at the cache line identified by the pointer.

The outbound transaction controller 180 decodes the remaining atomic transactions queued in the outbound transaction controller. For each, the outbound transaction controller 180 provides to the staging buffer controller 166 the pointer of the cache lines location in the staging buffer and the length of data to be read. Reads of cache lines for subsequent atomic transactions always begin at the first cache segment of the cache line. Accordingly, the outbound transaction controller 180 need not identify a cache segment to begin a read. Of course, one may be identified to simplify the signaling between the controllers 180 and 166.

The staging buffer controller 166 reads data to the outbound FIFO queue 120 for each of the subsequent transactions.

The MIOC 100 reads data out of the outbound FIFO queue 170 to the format encoder 114. The transaction ID and the length field is read to the format encoder 114 first. Thereafter, the cache segments are read out of the outbound FIFO queue 170. As with the non-atomic transaction, reading of data may begin at a certain data segment within the first queued cache segment. The lower order address bits are used by the outbound transaction controller 180 to select a first data segment to be read out. The outbound transaction controller 180 causes the data segment to be passed through the selection switch 176 then advances to the next data segment. The outbound transaction controller 180 continues to read data segments and advance until it has traversed the number of data segments identified by the length field. When the last data segment of a cache segment is reached, advancing to the next data segment causes a wrap to the beginning of a next cache segment.

The format encoder 114 receives the transaction ID, length field and retrieved data from the outbound FIFO queue 170. It formats the information into a response message and outputs it to the serial bus 70.

Thus, the present invention provides a MIOC 100 that supports read requests from the serial bus that implicate data of at least two cache lines.

Figure 3:
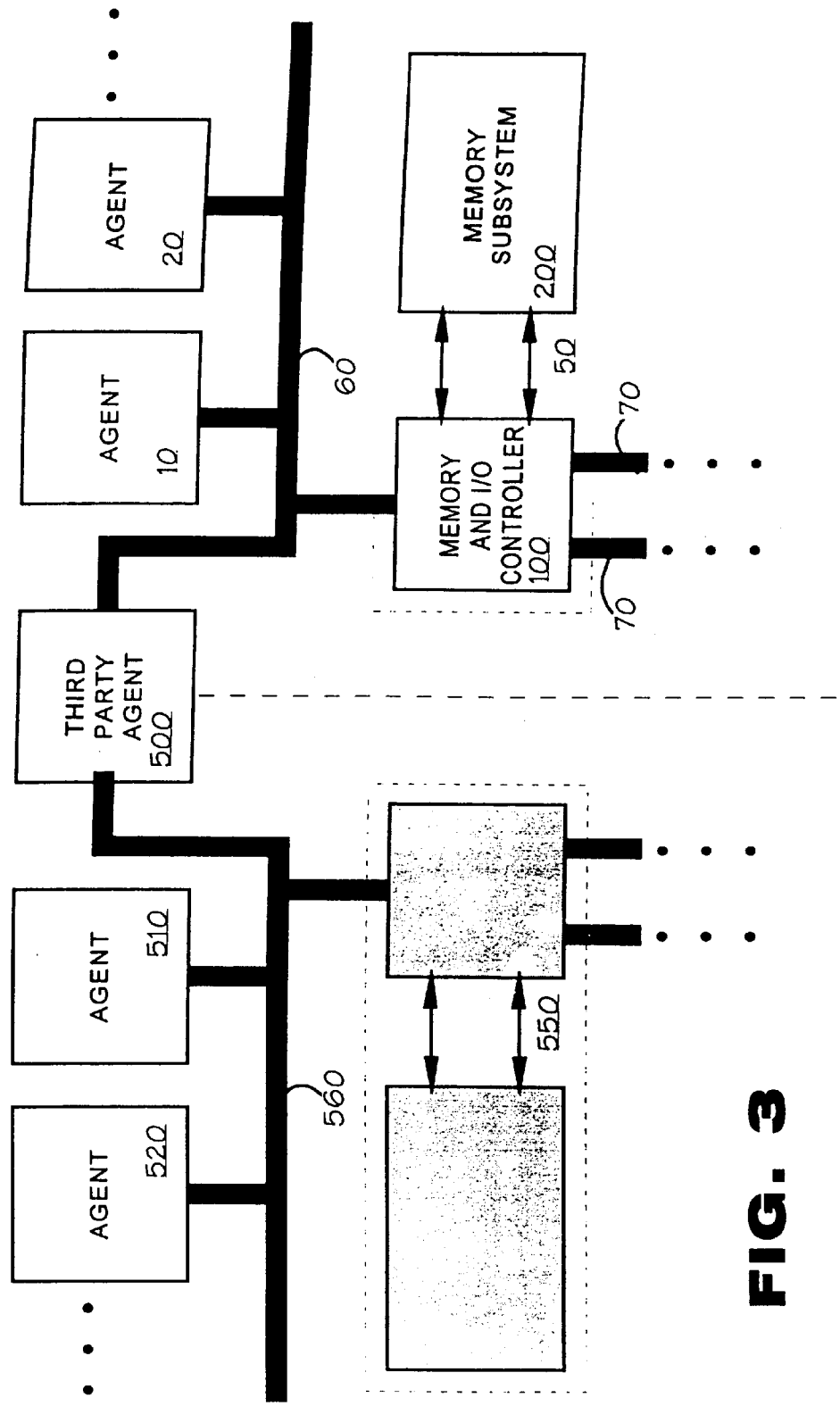
FIG. 3 is a block diagram of a system constructed in accordance with a second embodiment of the present invention.

In another embodiment, the memory controller 100 of the present invention may be applied to a pipelined bus 60 to which clustering agents are attached. A clustering agent is one that interconnects to the pipelined bus and may respond to a bus transaction with a RETRY response. Clustering agents are known for pipelined buses 60. For illustrative purposes, a typical implementation is illustrated in FIG. 3.

In FIG. 3C clustering agent 500 interconnects the pipelined bus 60 to another pipelined bus 500. Another plurality of agents 510–520, 550 may be attached to the second pipelined bus 560. In such clustering agent systems, agents from the first pipelined bus 60 may exchange data with agents from the second pipelined bus 560 and vice versa. For example, at any given time, agent 520 may hold a copy of data that is stored in an address of the first memory subsystem 200. The clustering agent 500 typically monitors data as it crosses bus boundaries. However, although it can determine whether an agent stores a copy of data at a particular address, it may not record whether the copy has been modified. For example, when an agent 520 has exclusive rights to data, it may modify the data without signaling the clustering agent 500 over the pipelined bus 560.

Consider an example where MIOC 100 receives a variable length read request from a serial bus 70 directed to a particular address. A copy of data at the requested address is held exclusively by agent 520. When the MIOC 100 issues a read invalidate transaction for the address, the clustering agent 500 cannot determine immediately whether the data is modified. It must coordinate with agent 520 to acquire cache coherency related to the read-invalidate transaction. Accordingly, clustering agent 500 issues a RETRY signal in response to the read invalidate transaction. RETRY responses are known; they cause a transaction to terminate and the issuing agent to retry the transaction at a later time. In the meantime, the clustering agent 500 coordinates with the agent 520 to obtain the necessary cache coherency results.

In an embodiment where the pipelined bus 60 accommodates clustering agent 500, the MIOC 100 accommodates RETRY responses in response to read transactions or read invalidate transactions. Several alternatives are available for non-atomic and atomic transactions.

Non-Atomic Transactions

As noted above, the MIOC 100 issues a non-atomic transaction on the pipelined bus 60 when the read request from a serial bus 70 implicates data contained entirely within one cache line. The MIOC 100 may process a RETRY response to the non-atomic transaction in one of two ways: It may generate a retry response on the serial bus 70 or it may re-queue the transaction autonomously and retry it on the pipelined bus 60.

Where the MIOC 100 generates a retry response on the serial bus 70, the bus request decoder 124 receives the RETRY response from the pipelined bus 60 and stores it the outbound transaction queue 150. No space is allocated in the staging buffer 160. When the RETRY response advances out of the outbound transaction queue, it is queued in the outbound FIFO queue 170. The RETRY response is passed to the format encoder 114. The format encoder 114 generates a retry message according to the protocol of the serial bus and outputs it from the MIOC 100. In this alternative, it is up to the requesting agent on the serial bus 70 to retry the serial bus transaction.

Where the MIOC 100 autonomously retries the non-atomic transaction on the pipelined bus 60, the pipelined bus interface causes the non-atomic transaction to be re-queued. The MIOC 100 may include an out of order transaction queue (not shown) for this purpose. At some later point in time, the bus request generator 122 retrieves the non-atomic transaction from the request retry buffer and posts it on the pipelined bus 60 a second time. If the clustering agent 500 has been able to coordinate with the agents on the second pipelined bus 560, it possesses the cache coherency results and permits the transaction to proceed.

Atomic Transactions

When the read request from the serial bus 70 requests data of multiple cache lines, the MIOC 100 issues a plurality of atomic transactions. After the atomic transactions are stored in the outbound transaction queue 150, a RETRY response may be received to one or more of them. When a transaction is responded by a RETRY signal, the bus request decoder 124 amends the transaction as stored in the outbound transaction queue 150. The bus request decoder 124 enables a flag, typically a marking bit, to indicate that the transaction was responded to by a RETRY. When the atomic transactions are decoded, the outbound transaction controller 180 examines the marking flag of each atomic transaction to determine if it was retried. When it encounters a transactions that was retried, the outbound transaction controller 180 causes a response to be placed on the serial bus 70 that indicates that only part-of the requested data was retrieved. The outbound transaction controller 180 also provides the valid data that was received, the data that was received in response to the atomic transactions that preceded the retried atomic transaction. For example, if the fourth in a sequence of five atomic transactions drew a RETRY response from another agents, the outbound transaction controller 180 would cause the data of the first three transactions to be supplied in the response. Whatever data that was retrieved in response to the fifth atomic transaction is not provided.

If the first atomic transaction was responded by a RETRY, no data is returned. The outbound transaction controller 180 causes a RETRY response to be placed on the serial bus 70.

To return the partial requested data, the outbound transaction controller 180 recomputes the length of the data that is actually received. It includes the new length in the response message and indicates by the response type that only part of the requested data was received.

Several embodiments of the present invention are specifically illustrated and described herein. However, it will be appreciated that modifications and variations of the present invention are covered by the above teachings and within the purview of the appended claims without departing from the spirit and intended scope of the invention.

We claim:

1. In a memory controller directly connected to a system memory, to a pipelined bus and to a serial bus, the pipelined bus characterized by a cache line width, a method of processing a read request message received from the serial bus that implicates data within a single cache line, comprising:

receiving the read request message, issuing a read invalidate transaction on the pipelined bus identifying a cache line of the requested data, retrieving data of the cache line from the system memory to a queue, reading the requested data from the queue, and placing a response message on the serial bus, the response message containing the requested data.

2. The method of claim 1, further comprising, if cache coherency signaling associated with the read invalidate transaction indicates modified data:

terminating the retrieval of data from the system memory, and instead retrieving data of the cache line from the pipelined bus to the queue.

\* \* \* \* \*